Figure 1:
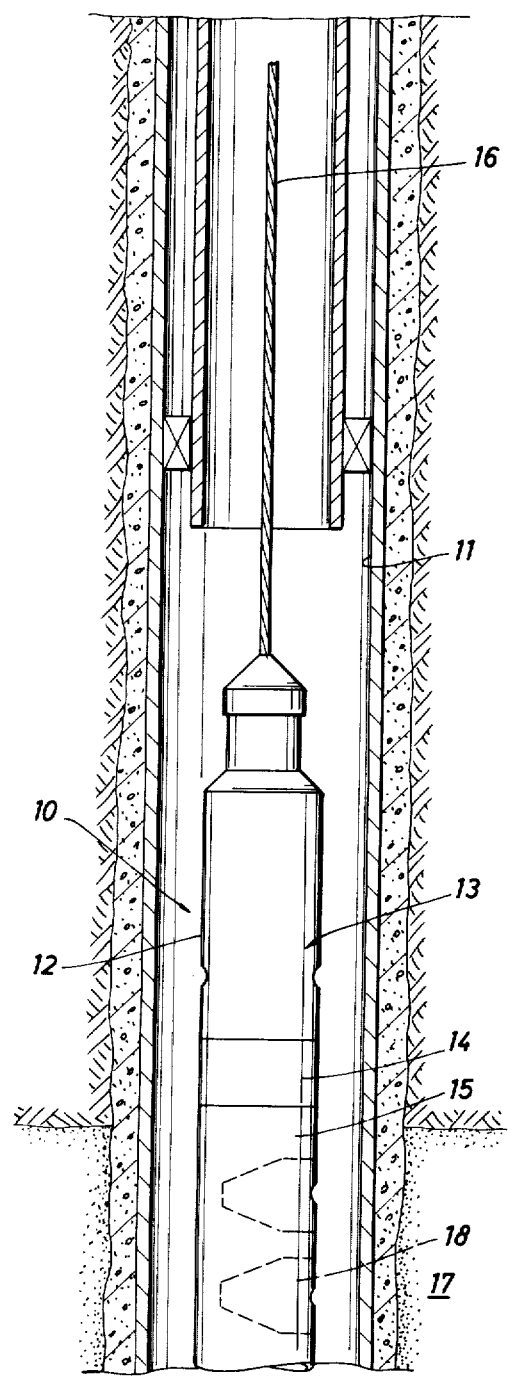

United States Patent [19]

Lanmon, II

[11] 4,237,972
[45] Dec. 9, 1980

[54] WELL BORE APPARATUS ADAPTED FOR BEING RELEASABLY COUPLED TO SUSPENSION CABLES

[75] Inventor: C. P. Lanmon, II, Friendswood, Tex.

[73] Assignee: Schlumberger Technology Corp., New York, N.Y.

[21] Appl. No.: 3,325

[22] Filed: Jan. 15, 1979

[51] Int. Cl.³ .................................. E21B 29/02
[52] U.S. Cl. ............................ 166/54.5; 102/21.2
[58] Field of Search ............. 166/54.5, 54.6, 55, 166/55.2, 55.3, 298; 102/21.2

[56] References Cited

U.S. PATENT DOCUMENTS

| | | | |
|---|---|---|---|
| 2,794,619 | 6/1957 | Lawrence et al. | 166/54.6 |
| 2,825,536 | 5/1958 | Kenneday et al. | 166/54.5 |
| 2,965,031 | 12/1960 | Johns | 175/4.51 |
| 3,010,515 | 11/1961 | Harrison et al. | 166/54.5 |
| 3,036,522 | 5/1962 | Lindsey | 166/54.6 |
| 3,073,388 | 1/1963 | Chenault | 166/54.5 |

Primary Examiner—James A. Leppink
Assistant Examiner—Richard E. Favreau

[57] ABSTRACT

In the several representative embodiments of well bore apparatus disclosed herein adapted for releasable connection to a suspension cable, a cable-cutting member is arranged within an upper portion of the well bore apparatus for parting the lower end portion of the cable connected to the apparatus. In the disclosed embodiments of the invention, the cutting member is retained in an inactive position and chemically-degradable securing means are cooperatively arranged to fail only upon the elapse of a prolonged time interval so as to actuate the cable-cutting member should the apparatus have become stuck in a well bore. Provisions are also made for replacing the securing means upon return of the apparatus to the surface before the expiration of the predetermined time interval.

12 Claims, 4 Drawing Figures

U.S. Patent  Dec. 9, 1980  Sheet 1 of 2  4,237,972

U.S. Patent Dec. 9, 1980 Sheet 2 of 2 4,237,972

WELL BORE APPARATUS ADAPTED FOR BEING RELEASABLY COUPLED TO SUSPENSION CABLES

It is not at all uncommon for a cable-suspended well tool such as a perforator or logging instrument to become stuck in a well bore as it is being used. When the tool cannot otherwise be dislodged, the usual practice is to selectively release the lower end of the cable from the tool and employ so-called "fishing" equipment for pulling the stuck tool free. Ordinarily selective release of the cable is provided for by tandemly interconnecting the free end of the cable to the well tool by way of a so-called "weak-point member" having less tensile strength than the cable. Thus, should the tool become stuck, the cable can often be disconnected by operating the cable winch so as to pull on the surface end of the cable with sufficient force to break the interlinking weak-point connection in the tool head.

A weak-point connection must, of course, have sufficient tensile strength to support the static weight of the tool as well as to withstand whatever additional dynamic loads that may be experienced either in raising the tool or in reasonable efforts to dislodge the tool should it become stuck. As a result of such load-carrying requirements, a given weak-point member may be so strong that, in some circumstances, the suspension cable instead parts near the surface as it is being tensioned to break the weak-point member. By way of example, assume that a tool which is stuck in a well bore is suspended from a cable having an average tensile strength of 12,000-pounds and that the particular weak-point member in that tool head is designed to fail at 6,000- pounds. As the weight of that part of the cable already in the well bore approaches 6,000-pounds, it becomes more likely that the suspension cable will instead part near the top of the well bore before sufficient tension can be applied to break the weak-point member. Similarly, an undetected weakened portion of a given cable can also break before the weak-point member breaks. These problems will, of course, become more pronounced as the operating depth increases and a greater length of cable is in the well bore.

Breaking of the cable at some intermediate point must be avoided if at all possible so that a loose skein of cable will not be left on top of the tool to unduly hamper subsequent fishing operations. Thus, when it is feared that the cable might break at some remote point above a stuck tool, one practice commonly used heretofore has been to utilize a specialized cable-cutting device for severing the cable as close as possible to the stuck well tool. For the large part, these cutting devices generally employ either a cutting blade (e.g. as in U.S. Pat. No. 2,794,619) or an explosive charge (e.g., as in U.S. Pat. No. 3,036,522). In typical field use, the cutting device is loosely coupled around the suspension cable of the stuck well tool and the device is dropped or dispatched down the cable to a position that is hopefully right on or very near to the head of the tool. Then, a weight or so-called "go-devil" is loosely coupled to the suspension cable and also allowed to fall or slide down the cable. Hopefully, the go-devil will fall fast enough that it will strike the actuator on the now-stationary cutting device with sufficient impact for cutting the cable.

As shown in U.S. Pat. No. 3,010,515, for example, an alternative arrangement for cable-cutting devices has been to instead use a chemically-degradable link for releasably securing one or more self-biased cutting blades. Just before the cutting device is dropped into the well bore a vial of acid or some suitable corrosive substance in the device is then broken with the expectation being that the device can be correctly positioned just above the stuck well tool before the corrosive chemical has had time to sever the link holding the cutting blades.

Those skilled in the art will recognize that the successful operation of any of these impact-actuated cable-cutting devices requires that the cutting device be positioned at least close to the top of the stuck tool. This, however, is not always possible where well bore obstructions above the stuck well tool prevent the cutting device from reaching its destination. Moreover, there is no assurance that a go-devil will always reach the cutting device much less strike its actuator with sufficient force to be certain that the cutting device is operated. Even with self-contained chemically-released cutting devices such as described above, there also is no assurance the device can, in fact, be dropped and reliably positioned at or near to the stuck tool.

As a further example of these problems, where the cable itself has become stuck (as by keyseating or differential sticking in an uncased borehole) at one or more intermediate depth locations it may be felt that a cable-cutting device cannot be lowered past these locations to the tool head. In a similar fashion, a tool may become stuck below a restricted opening such as a landing nipple that makes it doubtful or impossible for a cable-cutting device to reach the stuck tool. In either of these situations, sufficient cable tension to break the weak-point member in the tool head usually cannot be applied from the surface without the cable being parted at some point well above the highest depth location where it is stuck. As a result, recovery of the well tool is a difficult and expensive fishing operation.

Should any one of these several types of cable-cutting devices fail to operate, the presence of the inoperative cutting device in the well bore above the stuck well tool will greatly complicate the recovery of the well tool. The problem is even further complicated should the cutting device become stuck at one intermediate depth location and its go-devil actuator stop at a much-higher intermediate depth location. It should also be noted that once one of these cutting devices is dropped into a well bore, it is doubtful that the depth location of either the device or its actuating go-devil can be determined with any degree of accuracy. Thus, unless it is reasonably certain that one of these cutting devices can be positioned close to the stuck tool and then operated, it is often considered to be much safer to simply attempt recovery of the stuck well tool without uncoupling its suspension cable.

Because of these many problems, various proposals have been made heretofore for providing cable-coupling devices in the tool bodies that will allow the suspension cable to be selectively uncoupled from the well tool with reduced levels of cable tension. For example, as disclosed in U.S. Pat. No. 3,327,784 and U.S. Pat. No. 3,373,817, cable-coupling devices of this nature have heretofore employed solenoid-actuated mechanisms for selectively disabling or bypassing the standard weak-point connection so that a somewhat-lower tension force will then be sufficient for freeing the cable. With such cable-coupling devices, however, their minimum-allowable release forces are ordinarily about twice the weight of the tool; and experience has shown that even such minimal release forces can well be unacceptably excessive. Those skilled in the art will further appreciate that since typical well bore guns are commonly carried by single-conductor cables, safety considerations could well preclude the connection of these solenoid-operated release mechanisms to the same conductor used to detonate an explosive device.

As shown in U.S. Pat. No. 3,517,740, another type of cable-coupling device used heretofore includes an electrically-actuated explosive charge in the tool head that is adapted for selectively severing the weak-point member should it not be possible to safely pull on the cable. Although explosive devices such as this have an advantage in requiring little or no cable pull to release the cable, their reliability is wholly dependent upon the effectiveness of the explosive. As is recognized by those skilled in the art, any explosive is seriously affected, if not rendered totally inoperative, should it be exposed to extreme well bore temperatures for only a few hours. Under such conditions it may be believed necessary to quickly operate the coupling device for fear there is insufficient time to first attempt other procedures for freeing the stuck tool. In addition to the usual problems experienced in handling, shipping and storing explosives, prudent preventative maintenance procedures may also require replacement of the unexpended explosive charges each time these explosive cable-coupling units have been subjected to extreme well bore temperatures for any significant length of time. Moreover, as with any explosive device, these release devices are ordinarily limited for use on tools supported by a multiple-conductor cable so that a given conductor can be exclusively dedicated to the release device.

Accordingly, it is an object of the present invention to provide new and improved well bore apparatus adapted for being releasably coupled to a suspension cable, with this apparatus being specially arranged for reliably effecting a delayed release of the suspension cable should the apparatus not be returned to the surface within a reasonable period of time.

This and other objects of the present invention are attained by cooperatively arranging well bore apparatus to include cutting means and normally blocking the operation thereof for releasing the suspension cable from the apparatus by means of chemically- degradable restraining means. To activate the cutting means, before the apparatus is lowered into a well bore a corrosive chemical is released in the apparatus for causing failure of the restraining means only after the elapse of a predetermined time interval that is ordinarily more than sufficient for carrying out the intended operation of the apparatus.

Figure 2:
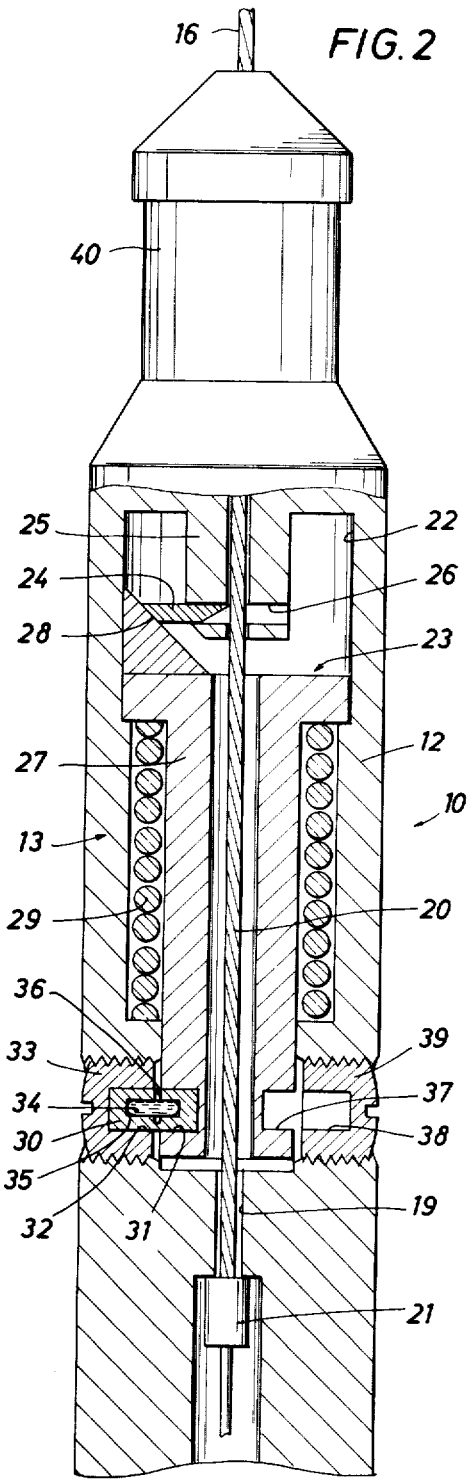
Figure 3:
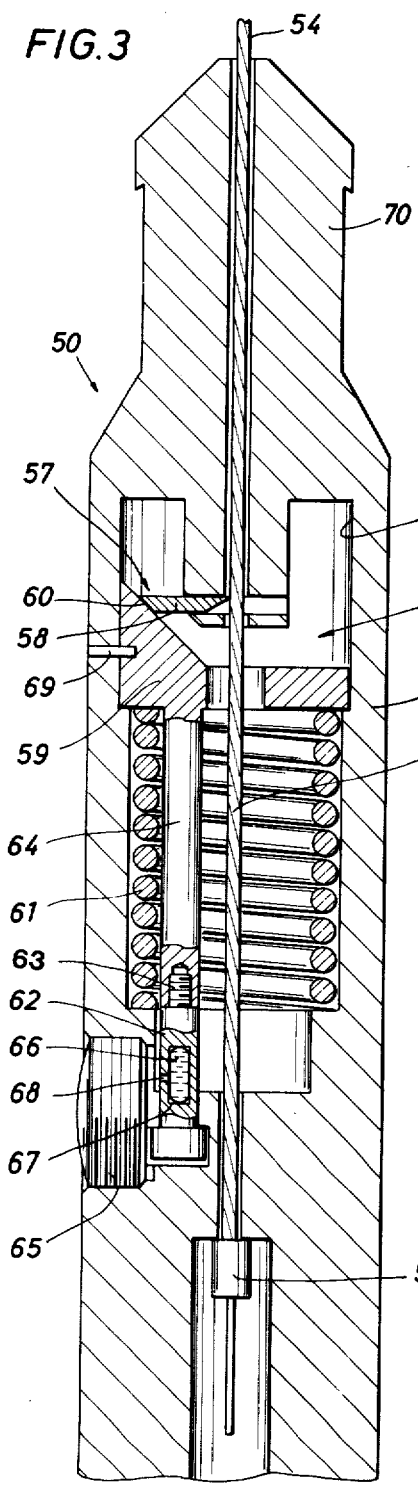
Figure 4:
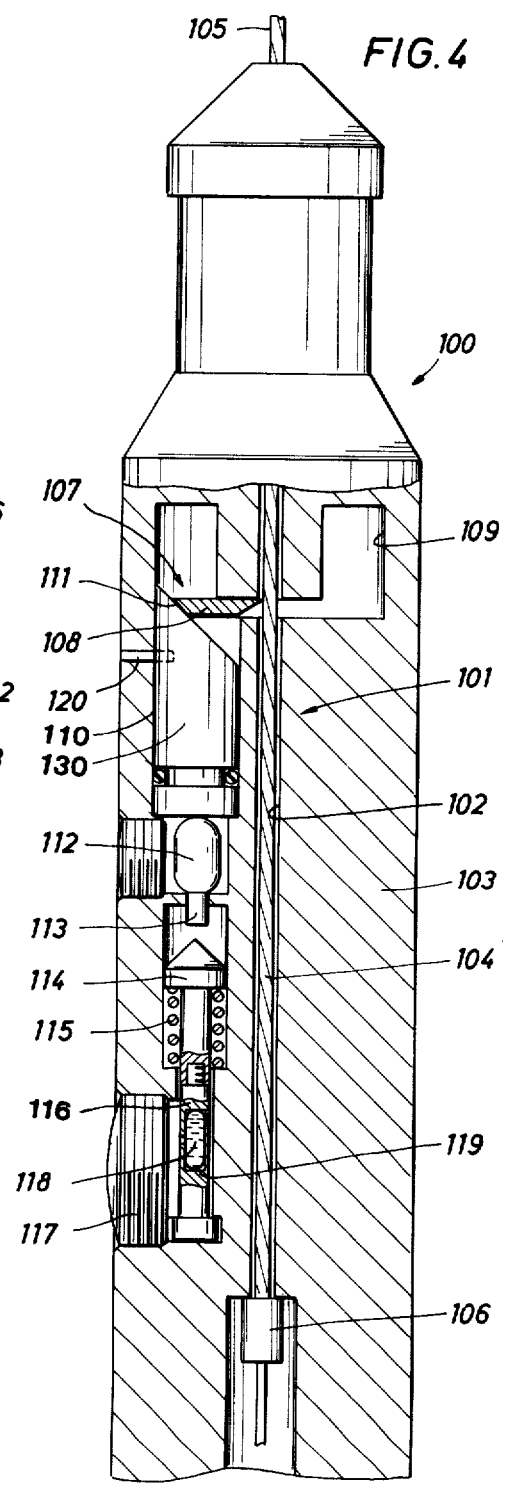

The novel features of the present invention are set forth with particularity in the appended claims. The invention, together with further objects and advantages thereof, may be best understood by way of the following description of several exemplary embodiments of new and improved apparatus respectively employing the principles of the invention as illustrated in the accompanying drawings, in which:

FIG. 1 is a schematic representation of new and improved well bore apparatus as it may appear when it is being operated in a cased well bore; and FIGS. 2, 3 and 4 respectively illustrate three alternative embodiments of well bore apparatus respectively incorporating the principles of the present invention.

Turning now to FIG. 1 to illustrate a typical application of the well bore apparatus 10 of the present invention the apparatus is shown in a cased well bore 11 and includes an enclosed upper body 12 enclosing releasable cable-coupling means 13 and tandemly supporting a typical casing-collar locator 14 and well-completion means such as a core-sampling gun or a perforating carrier 15 such as shown either in U.S. Pat. No. 3,429,384 or in U.S. Pat. No. 3,951,218. As is customary with such well-completion equipment, the apparatus 10 is dependently coupled to an armored suspension cable 16 having only a central electrical conductor. The cable 16 is spooled on a winch (not shown) conveniently situated adjacent to the well bore 11 whereby the carrier 15 can be accurately positioned for perforating a selected earth formation, as at 17, upon detonation of one or more shaped explosive charges as at 18.

Turning now to FIG. 2, the upper body 12 is schematically shown in partial cross section to illustrate one way in which the cable-coupling means 13 may operatively embody the principles of the present invention. As depicted, a longitudinal bore 19 is arranged in the body 12 for receiving the load-supporting lower end-portion 20 of the suspension cable 16 which is terminated by a typical rope socket 21 as may be conveniently arranged for mechanically coupling or securing the cable to the body. It will be recognized, of course, that if desired, the load-supporting end-portion 20 could also be a typical weak-point connection (not shown).

The mid-portion of the body 12 is also constructed to define a central chamber 22 above the rope socket 21 in which cable-severing means 23 are operatively disposed and adapted for severing the cable end-portion 20. In the preferred embodiment of the well bore apparatus 10 depicted in FIG. 2, the cable-severing means 23 include a single cutting member or blade 24 that is movably supported by a suitable guide member 25 in the top of the chamber 22 and cooperatively arranged for movement along a cutting path intersecting the axial bore 19. It will be noted that the sharp corner defined by the junction of the axial bore 19 with a transverse passage 26 carrying the blade 24 effectively cooperates with the cutting edge of the blade to assure that the movement of the blade across the axial bore will completely sever the cable end-portion 20.

To effect the cutting movement of the blade 24, the cable-severing means 23 further include an actuating member 27 that is movably positioned in the chamber 22 and adapted to be driven upwardly from its depicted lower position to a more-elevated or higher position. Camming means as preferably defined by complementally-tapered or mating wedge surfaces, as at 28, are respectively arranged on adjacent facing surfaces of the blade 24 and the actuating member 27 and collectively adapted for forcing the blade transversely through the cable end-portion 20 as the actuating member is driven upwardly. In the illustrated preferred embodiment of the cable-coupling apparatus 13, upward movement of the actuating member 27 is accomplished by biasing means such as a stout compression spring 29 cooperatively arranged in the chamber 22 and sized for driving the blade 24 laterally with sufficient force to assure severance of the cable end-portion 20.

In keeping with the objects of the present invention, the blade 24 is normally held in its depicted retracted position and its release is controlled by time-delayed retaining means including a chemically-corrodible element such as a replaceable link or pin 30. To facilitate its replacement, the pin 30 is preferably mounted in opposed axially-aligned holes 31 and 32 respectively arranged in the blade actuator 27 and the adjacent end surface of a plug 33 threadingly secured in a port in the body 12. There is, of course, no necessity for the actuating member 27 to be released at a precisely-determined time so long as the resulting delay interval adequately assures completion of the expected downhole operation with the tool 10 and its return to the surface. The maximum time period should, of course, be no greater than is reasonably necessary. Accordingly, time-delayed release of the retaining means is preferably accomplished by disposing a corrosive material such as an acid 34 in a central cavity 35 in the corrodible pin 30 and selectively designing the pin and the biasing spring 29 that the pin will break only after the acid has eaten away at least a portion of the pin body. Similar time-controlled releases can also be provided with many different combinations of corrosive substances and corrodible materials such as by utilizing either strong caustics with various aluminum alloys or different solvents with solvent-sensitive plastics for any given combination of the spring 29, the retaining pin 30, and the corrosive substance 34.

Different techniques can, of course, be employed for initially bringing the corrosive substance 34 into operative contact with the corrodible retaining pin 30. One technique would be to simply fill the cavity 35 with the corrosive substance 34 and install the pin 30 shortly before lowering the apparatus 10 into the well bore 11. Alternatively, the chemical 34 may be encapsulated in a frangible or easily-punctured sheath (not illustrated in FIG. 2) of a protective material that is broken or pierced by inserting a suitable tool (not shown) into an access passage 36 in the retaining pin 30. In any case, it will be appreciated that the actuating member 27 will be restrained from moving upwardly as necessary for driving the cutting blade 24 through the cable end-portion 20 only as long as the retaining pin 30 remains relatively intact. To guard against cutting of the cable portion 20 should the retaining pin 30 inadvertently fail while the apparatus 10 is at the surface, a much-stronger safety pin (not shown) is typically inserted in opposing bores 37 and 38 respectively provided in the actuating member 27 and another port plug 39 in the tool body 12.

Accordingly, in utilizing the new and improved cable-coupling means 13, the cable 16 is attached, as at 21, to the tool body 12. The corrosive substance 34 is released into its associated cavity 35 and the retaining pin 30 is inserted into the bores 31 and 32. Once the port plug 33 is replaced and the corrodible retaining pin 30 is temporarily securing the actuating member 27, the other port plug 39 is removed long enough to allow withdrawal of the stouter safety pin (not shown). The apparatus 10 is then ready to be lowered into the well bore 11.

In the large majority of well-completion operations, the apparatus 10 will, of course, function without mishap and be returned to the surface long before the corrosive substance 34 has corroded enough of the pin 30 that it will be broken by the force of the spring 29. Once the apparatus 10 is returned to the surface, the port plug 39 is momentarily removed and the safety pin (not shown) is reinserted into the opposed bores 37 and 38 so as to positively secure the blade-actuating member 27 against inadvertent release while the tool is not in a well bore as at 11. The partially-corroded pin 30 is then removed and discarded.

Should, however, some unanticipated situation arise to cause the apparatus 10 to be irretrievably stuck in the well bore 11, it will be recognized that the corrosive substance 34 will ultimately corrode the pin 30 so that the pin will be broken by the force of the spring 29. Once it is released, the actuating member 27 is forced upwardly by the spring 29 and the blade 24 is forcibly driven across the cable end-portion 20. This will, of course, allow the cable 16 to be retrieved so as to then allow a typical fishing tool (not shown) to be lowered and engaged with the fishing neck 40 at the upper end of the tool body 12. Conventional fishing operations will then be carried out as required to recover the apparatus 10.

Turning now to FIG. 3, an alternative embodiment is shown of new and improved apparatus 50 illustrating another way in which the principles of the present invention may be operatively embodied. As depicted, the apparatus 50 includes cable-coupling means 51 having a body 52 to which a supporting member such as the lower end-portion 53 of a suspension cable 54 is mechanically secured as at 55. An enlarged chamber 56 defined within the body 52 carries cable-severing means 57 which are operatively arranged for severing the cable end-portion 53. The cable-severing means 57 employed in the preferred embodiment of the cable-coupling means 51 depicted in FIG. 3 include a movable cutting member or blade 58 that is cooperatively arranged in the top of the chamber 56 for readily cutting through the cable end-portion 53. The cable-severing means 57 further include an actuating member 59 that is arranged in the chamber 56 for movement upwardly to a more-elevated position. Complementally-tapered wedge surfaces are respectively arranged, as at 60, on the adjacent opposed surfaces of the blade 58 and the actuating member 59 for defining camming means to drive the blade into cutting engagement with the cable end-portion 53 whenever the actuating member is driven to its elevated position. As was done with the first-described well bore apparatus 10, upward movement of the actuating member 59 in the apparatus 50 is also accomplished by a stout compression spring 61 cooperatively arranged in the chamber 56 and having the required strength for driving the blade 58 laterally with sufficient force to assure the severance of the cable end-portion 53.

In keeping with the objects of the present invention, the blade 58 and its actuator 59 are normally held in their depicted retracted positions and their release is delayed by time-delayed retaining means including a chemically-corrodible member as at 62 securing the blade actuator to the body 52. It is preferred that the corrodible member be a shorter link 62 joined as by threads 63 to a permanent member 64 connected to the actuator 59. For convenience, a port plug 65 is threadingly secured in a port arranged in the body 52 to facilitate replacement of the link 62. Time-delayed release of the retaining means is preferably accomplished by disposing a capsule 66 containing a corrosive material in a central cavity 67 in the corrodible link 62. As previously described with reference to the apparatus 10, the link 62 and the biasing spring 61 for this apparatus 50 are also cooperatively arranged for releasing the actuator 59 once the corrosive material is in the capsule 66. Hereagain, the time-controlled operation of the apparatus 50 is determined by selecting the appropriate corrosive and corrodible materials for the capsule 66 and the link 62, with these choices needing only to be such that the delayed release of the actuating member 59 occurs only after there has been sufficient time to assure completion of the expected downhole operation with the apparatus 50 and its return to the surface.

In the operation of the new and improved cable-coupling apparatus 51 of the present invention, the lower end-portion 53 of the cable 54 is attached to the tool body 52 as at 55. The port plug 65 is removed and the retaining link 62 is inserted into the chamber 56 once the capsule 66 containing the corrosive substance is broken as by puncturing the capsule by way of an associated passage 68. Once the corrodible link 62 is in position to temporarily secure the actuating member 59, the port plug 65 is replaced and a stouter retaining pin 69 is withdrawn. The well bore apparatus 10 is ready to be lowered into the well bore as at 11.

As previously discussed, the particular well-completion operation of the apparatus 10 will usually be routinely conducted and it will be returned to the surface long before the corrosive substance in the capsule 66 has corroded enough of the link 62 that it breaks. When the apparatus 10 is returned to the surface, the stouter retaining pin 69 is reinstalled to assure that the blade-actuating member 59 is secured so long as the body 52 is not in a well bore as at 11. The port plug 65 is momentarily removed and the partially-corroded link 62 is then removed and discarded.

Should, however, the apparatus 50 be irretrievably stuck, the link 62 will ultimately be corroded and broken by the force of the spring 61. The spring 61 then impels the actuating member 59 upwardly to force the blade 58 through the cable end-portion 53. Once the cable 54 is retrieved, a fishing tool (not shown) is then lowered and coupled to the fishing neck 70 at the upper end of the tool body 52 to recover the apparatus 50.

Turning now to FIG. 4, a cross-sectional view is shown of a third embodiment of new and improved apparatus 100 to illustrate still another arrangement of releasable cable-coupling means 101 of the present invention. As depicted, a longitudinal bore 102 is arranged in the body 103 of the apparatus 100 for receiving a support member such as the lower end-portion 104 of the suspension cable 105 which is suitably secured to the body as at 106. Cable-severing means 107 include a cutting member or blade 108 that is movably supported in the top of a chamber 109 in the body 103 and arranged for readily cutting through the cable end-portion 104. In a fashion similar to that done with the other tools 10 and 50, the cable-severing means 107 further include a cylindrical blade-actuating member 130 that is positioned in a cylindrical bore 110 intersecting the chamber 109 and adapted to be moved upwardly from its depicted lower position to a more-elevated or higher position. Mating wedge surfaces, as at 111, are respectively arranged on the adjacent opposed surfaces of the blade 108 and the blade-actuating member 109 serve as camming means for moving the blade transversely across the cable end-portion 104 as the actuating member is elevated.

To drive the blade-actuator 130, the cable-severing means 107 further include a propellant-type explosive charge 112 and an impact-responsive detonator 113 cooperatively positioned in the bore 110 and adapted to be actuated by the forcible movement of an explosive-actuating member 114 movably mounted in the bore below the explosive detonator. In the preferred embodiment of the cable-coupling apparatus 101, upward movement of the explosive-actuating member 114 is accomplished by biasing means such as a stout compression spring 115 cooperatively arranged in the chamber 109. Upon actuation of the member 130, the blade 108 is driven laterally with sufficient force to sever the cable end-portion 104.

In keeping with the objects of the present invention, the explosive actuating member 114 is normally held in its depicted retracted position by time-delayed retaining means including a chemically-corrodible link 116 that is threadingly coupled to the explosive actuating member. To provide convenient access to the explosive actuator 114, a removable plug 117 is threadingly secured in a port in the body 103. Time-delayed release of the actuator 114 is preferably accomplished by disposing an encapsulated corrosive material such as an acid 118 in a central cavity 119 in the corrodible link and selectively designing the link 116 so that once the acid is released, the force of the biasing spring 115 will ultimately break the link once at least a portion of it is eaten away.

It will be recognized, of course, that the explosive actuating member 114 will be restrained from moving upwardly only as long as the retaining pin 116 remains relatively intact. To be certain that the retaining pin 116 does not inadvertently fail while the tool 100 is at the surface, it is preferred that a safety or retaining pin 120 of greater strength be inserted in the body 103 and the blade-actuating member 109.

Accordingly, in operating the new and improved cable-coupling apparatus 101 of the present invention, the cable 105 is attached to the tool body 103 as at 106. The explosive charge 112 and its associated detonator 113 are installed. The port plug 117 is removed and the retaining pin 116 is inserted into the bore 110 after the corrosive substance 118 has been released into its associated cavity 119. Once the port plug 117 is replaced and the corrodible retaining pin 116 is temporarily securing the actuating member 114, the stouter retaining pin 120 is removed and the tool 100 is lowered into the well bore as at 11.

There is, of course, no problem when a well-completion operation is completed and the tool 100 is returned to the surface before the corrosive substance 118 has been effective to cause failure of the pin 116. When this occurs, the stouter safety pin 120 is reinserted to positively secure the blade-actuating member 109 against inadvertent release. The port plug 117 is opened and the partially-corroded link 116 is removed and discarded.

As discussed with reference to the other tools 10 or 50, should the tool 100 become irretrievably stuck, the corrosive substance 118 will severely corrode the link 116 and the spring 115 will ultimately break the link 116. Once that happens, the explosive actuating member 114 is driven upwardly by the spring 115 to strike the detonator 113 and ignite the explosive charge 112. The explosive gases will then propel the blade actuator 109 upwardly and the blade 108 will be forcibly driven through the cable end-portion 104. This will, of course, allow the cable 105 to be retrieved. Conventional fishing operations will then be carried out as required to recover the tool 100 if such is even possible. In any event, the cable 105 will ordinarily be retrieved with little difficulty to thereby clear the well bore above the tool.

While only particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Well bore apparatus comprising:
   body means adapted for suspension in a well bore by a suspension cable having a load-supporting end-portion;
   means on said body means adapted for carrying well tools;
   means on said body means defining a space adapted for receiving a load-supporting end-portion of a suspension cable that is to be secured to said body means; and
   means cooperatively arranged on said body means for severing a load-supporting end-portion of a suspension cable disposed in said space only after the elapse of a given time interval and including a cutting blade adapted for transverse movement from a normally retained position on one side of said space to another position on the opposite side of said space,
   an actuating member adapted for movement axially along said body,
   force transferring means for transferring axial force of said actuating member to force said cutting blade across said cable in said space,
   a spring for forcing said actuating member via said force transferring means against said cutting blade, and
   time-delayed retaining means for preventing axial movement of said actuating member for said given time interval, said retaining means having a chemically-corrodible element within a chamber cooperatively arranged therein and adapted for bringing a corrosive chemical into operative contact within the chemically-corrodible element at the beginning of the given time interval to progressively attack said element until its failure, thereby ending said given time interval, whereby upon failure of said chemically-corrodible element, said spring causes said actuating member via said force transferring means to drive said cutting blade toward its other position.

2. The well bore apparatus of claim 1 wherein said chemically-corrodible element is a metal and said corrosive chemical is an acid.

3. The well bore apparatus of claim 1 wherein said chemically-corrodible element is aluminum and said corrosive chemical is a caustic.

4. The well bore apparatus of claim 1 wherein said chemically-corrodible element is a plastic and said corrosive chemical is a plastic solvent.

5. Well bore apparatus comprising:
   body means adapted for suspension in a well bore;
   well tool means on said body means;
   a suspension cable having a load-supporting lower end-portion;
   means on said body means defining a space receiving said load-supporting cable end-portion;
   means cooperatively arranged for securing said load-supporting cable end-portion to said body means;
   means on said body means cooperatively arranged for severing said load-supporting cable-end portion and including a cutting blade arranged for movement from a normal position on one side of said space to another position on the opposite side of said space, explosive means operatively arranged for driving said cutting blade from its said normal position to its said other position with sufficient force for severing said load-supporting cable end-portion; and
   time-delayed detonating means operable only after the elapse of a give time interval for detonating said explosive means to drive said cutting blade to its said other position wherein said time-delayed detonating means include a detonating explosive operative for detonating said explosive means, an actuating member operative for detonating said detonating explosive, a chemically-corrodible element including a chamber cooperatively arranged within said chemically-corrodible element and adapted for bringing a corrosive chemical into operative contact with said chemically-corrodible element at the beginning of said given time interval to then progressively attack said element until its failure and thereby ending said given time interval, and biasing means arranged for driving said actuating member against said detonating explosive upon failure of said chemically-corrodible element.

6. The well bore apparatus of claim 5 wherein said time-delayed detonating means further include means cooperatively arranged and adapted for bringing a corrosive chemical into operative contact with said chemically-corrodible element at the beginning of said given time interval to then progressively attack said element until its failure and thereby ending said given time interval.

7. The well bore apparatus of claim 5 wherein said chemically-corrodible element is a metal and said corrosive chemical is an acid.

8. The well bore apparatus of claim 5 wherein said chemically-corrodible element is aluminum and said corrosive chemical is a caustic.

9. The well bore apparatus of claim 5 wherein said chemically-corrodible element is a plastic and said corrosive chemical is a plastic solvent.

10. Well bore apparatus comprising:
    body means adapted for suspension in a well bore by a suspension cable having a load-supporting end-portion;
    means on said body means adapted for carrying well tools;
    means on said body means defining a space adapted for receiving a load-supporting end-portion of a suspension cable that is to be secured to said body means;
    means cooperatively arranged on said body means for severing a load-supporting end-portion of a suspension cable disposed in said space only after the elapse of a given time interval and including
    a first actuating member adapted for movement axially along said body;
    force transferring means for transferring axial force of said actuating member to force said cutting blade across said cable in said space;
    explosive means for forcing said first actuating member via said force transferring means against said cutting blade;
    time-delayed explosive actuating means having
    a second actuating member,
    a spring for urging said second actuating member axially toward said explosive means, and a retaining means for preventing axial movement of said second actuating member, said retaining means having a chemically-corrodible element within a chamber cooperatively arranged therein and adapted for bringing a corrosive element into operative contact within the chemically-corrodible element at the beginning of given time interval to progressively attack said element until its failure, thereby ending said given time interval, whereby upon failure of said chemically-corrodible element said second actuating member is forced by said spring against said explosive means causing said actuating member via said force transferring means to drive said cutting blade toward its other position.

11. The well bore apparatus of claim 10 wherein said explosive means comprises a detonator in proximity with an explosive charge, said detonator adapted for ignition when said second actuating member is forced against it by said spring, the ignition of said detonator causing said explosive charge to explode.

12. The well bore apparatus of claim 10 wherein said force transferring means comprises camming means complementally tapered on said cutting blade and said actuating member.

* * * * *